(12) United States Patent
Schindler et al.

(10) Patent No.: US 8,357,416 B2
(45) Date of Patent: Jan. 22, 2013

(54) METHOD AND APPARATUS FOR THE PRODUCTION OF MILK FOAM OR MILK-BASED DRINKS

(75) Inventors: Thorsten Schindler, Weggis (CH); Jean-Paul In-Albon, Ardon (CH)

(73) Assignee: Steiner Weggis AG, Weggis (CH)

( * ) Notice: Subject to any disclaimer, the term of this patent is extended or adjusted under 35 U.S.C. 154(b) by 567 days.

(21) Appl. No.: 12/522,104

(22) PCT Filed: Jan. 7, 2008

(86) PCT No.: PCT/EP2008/000048
§ 371 (c)(1),
(2), (4) Date: Nov. 19, 2009

(87) PCT Pub. No.: WO2008/083941
PCT Pub. Date: Jul. 17, 2008

(65) Prior Publication Data
US 2010/0075007 A1      Mar. 25, 2010

(30) Foreign Application Priority Data

Jan. 9, 2007 (CH) ..................................... 0015/07
May 18, 2007 (CH) ..................................... 0802/07

(51) Int. Cl.
*A23C 9/00* (2006.01)
(52) U.S. Cl. .................. 426/474; 426/491; 426/511
(58) Field of Classification Search .............. 426/34, 426/569, 588, 394, 409, 506, 510–511, 590, 426/519, 474, 477, 476, 490–491; 99/451, 99/275, 323.1, 565.01, 302 R, 295, 323.3; *A23C 9/00*
See application file for complete search history.

(56) References Cited

U.S. PATENT DOCUMENTS

| | | | |
|---|---|---|---|
| 4,620,953 A | 11/1986 | Silla et al. | |
| 7,178,453 B2 | 2/2007 | In Albon | |
| 7,527,818 B2 | 5/2009 | Dirren | |
| 2005/0233043 A1* | 10/2005 | Dirren | ............ 426/569 |

* cited by examiner

*Primary Examiner* — Steven Leff
(74) *Attorney, Agent, or Firm* — Brian Roffe

(57) ABSTRACT

During a method for the production of milk foam or milk-based drinks, milk is sucked with a pump (1) out of a container (3, 3') and conveyed to an outlet (11'), wherein air and/or a gas is added to the milk. The milk/air mixture is processed in a cold state into milk foam and conveyed as cold milk foam to the outlet (11').

6 Claims, 1 Drawing Sheet

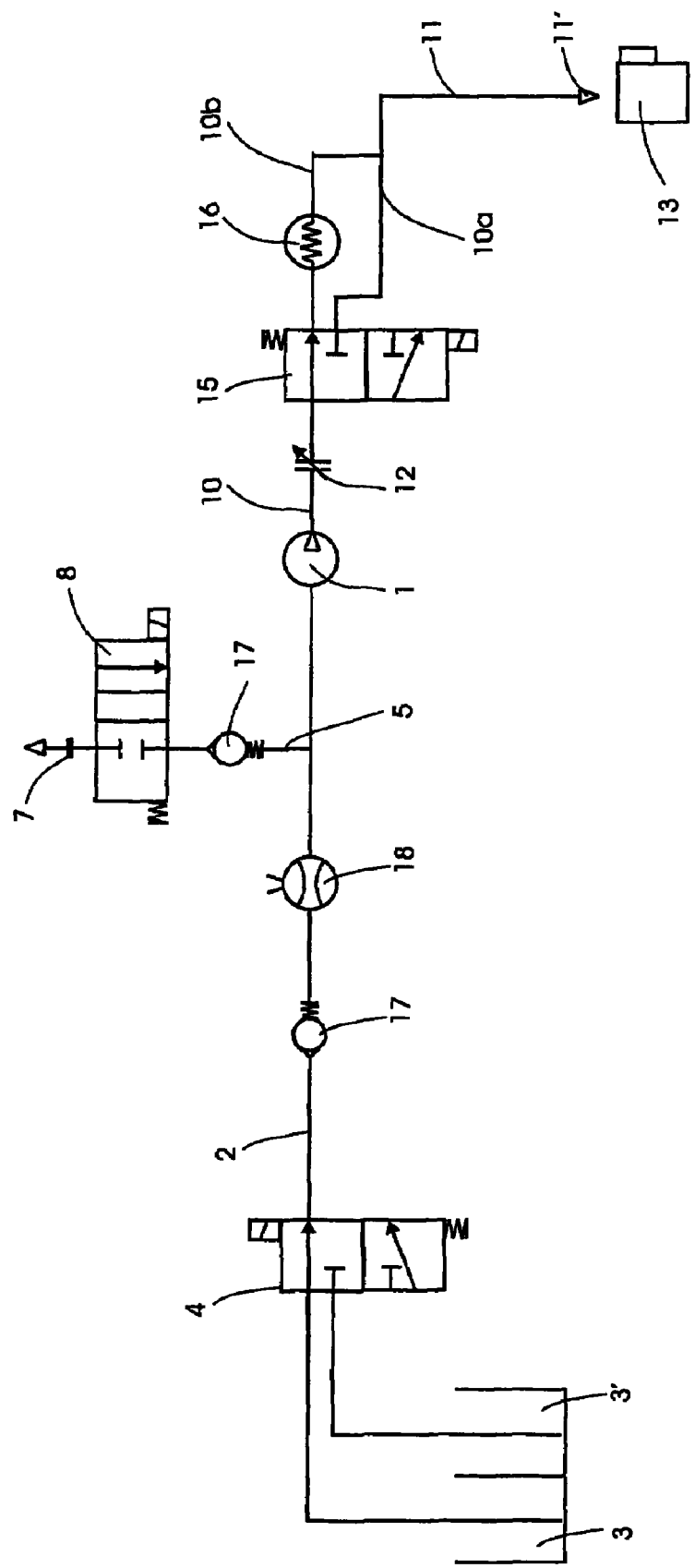

METHOD AND APPARATUS FOR THE PRODUCTION OF MILK FOAM OR MILK-BASED DRINKS

FIELD OF THE INVENTION

The invention relates to a method for the production of milk foam or milk-based drinks wherein milk is sucked with a pump out of a container and conveyed to an outlet, wherein air or a gas is selectively added to the milk and then the mixed milk and air or gas is processed to form milk foam, an apparatus for implementing the method and a coffee machine comprising such an apparatus.

BACKGROUND OF THE INVENTION

A method and an apparatus for the production of milk foam or of hot milk-based drinks is known from EP-A-1 593 330 wherein cold milk is sucked with a pump out of a container and passed through a flow heater and is thus heated, after which it is conveyed to an outlet via a throttle point. Thus, an exceptionally light milk foam can be produced in a simple manner when air or a gas is appropriately added to the milk.

OBJECTS AND SUMMARY OF THE INVENTION

The object which forms the basis of the present invention is to propose a method of the type specified at the start, and to provide an apparatus for implementing the method with which the choice of drinks can be extended.

This object is achieved according to the invention by a method including sucking milk into a suction line and conveying the milk through the suction line to an outlet using a pump, selectively mixing air or gas with the milk, providing first and second flow sections from a throttle point to the outlet, the throttle point acting on the milk after being selectively mixed with the air or gas to convert the mixed milk and air or gas into milk foam, only the first section having an associated heater, and controlling flow of the milk or milk foam from the throttle point to the outlet through the first and second sections to provide heated milk or milk foam at the outlet when the milk or milk foam passes through the first section and to provide unheated milk or milk foam at the outlet when the milk or milk foam passes through the second section, and by an apparatus having a pump sucking the milk from a container via a suction line, having an outlet line leading from the pump to an outlet, having an air supply line opening out into the suction line, with the outlet line having two parallel sections which can be enabled selectively by means of a valve between the throttle point and the outlet, a flow heater being assigned to one of these outlet line sections.

Preferred further embodiments of the method according to the invention and of the apparatus according to the invention form the subject matter of the dependent claims.

According to the invention cold milk foam of surprisingly good quality or cold milk or cold milk-based drinks can be conveyed to the outlet and be collected here in a container, for example a cup or a glass. This is particularly advantageous in certain countries with hot climates or during certain seasons. Preferably, the milk foam, the milk or the milk-based drink can be dispensed both in the cold and in the hot state. The apparatus according to the invention for the production of milk foam or milk-based drinks can be an independent piece of equipment or a component part of a coffee machine.

BRIEF DESCRIPTION OF THE DRAWINGS

In the following the invention is described in greater detail by means of the drawing. It shows:

FIG. 1 diagrammatically, an apparatus according to the invention for the production of milk foam or milk-based drinks.

DETAILED DESCRIPTION OF THE INVENTION

According to FIG. 1 the cold milk required for the production of milk foam or of milk-based drinks is sucked with a pump 1, preferably a geared pump, out of a container 3 via a suction line 2. As indicated in FIG. 1, a number of containers 3, 3', which, for example, can also contain milk with different additives such as chocolate, vanilla etc., can also be available and be connected selectively to the suction line 2 by means of a valve 4. However, these additives can be added to the milk in precise portions.

According to the invention cold milk foam of surprisingly good quality or cold milk or cold milk-based drinks can be conveyed to the outlet 11' and be collected here in a container 13, for example a cup or a glass.

An air supply line 5, by means of which a specific quantity of air (or of a gas) can be added to the milk, opens out into the suction line 2. The quantity of air can be determined by an air quantity regulator or by a throttle, e.g. a nozzle 7. The air supply line 5 is provided with an actuation valve 8 by means of which the air supply can be stopped when one is intending to produce a milk-based drink without any foam. In other words, depending on the position of the actuation valve 8 a milk/air mixture or the milk alone can be sucked out by the pump 1 and be pumped through a line 10 to an outlet line 11 and to an outlet 11', sometimes via a throttle point 12 which produces overpressure in the system and by means of which the quantity of milk or milk foam delivered can be determined. The throttle point 12 can be a throttle valve or a nozzle. With this throttle point the passage opening is tapered and then expanded again, by means of which the milk/air mixture supplied is converted into a milk foam.

The outlet line 11 provided as a pipe or tube is advantageously of a specific length, preferably up to 30 cm, so that the milk foam can continue to form in this outlet line 11 and in particular can also stabilise so that a high-quality foam with a constant consistency is produced when, for example, it has been passed into a cup 13.

It is also possible, however, to also produce and dispense hot milk or milk-based drinks or hot milk foam. For this purpose the line 10 has parallel sections 10a, 10b which can be enabled selectively by means of a valve 15, a flow heater 16 being assigned to one of these outlet line sections. Depending on the position of the valve 15 cold milk foam or cold milk or milk-based drinks can be conveyed directly to the outlet 11' via the one parallel section 10a, or the other outlet line section 10b is enabled, and the milk foam or the milk is heated in the flow heater 16 before being dispensed.

Corresponding one way valves 17 in the system prevent the milk or the air or the gas from flowing back. The flow quantity of the milk sucked by the pump 1 is also measured (measuring device 18). However, a time measurement could also be implemented in order to determine the flow quantity.

The apparatus according to the invention for the production of milk foam or milk-based drinks can—similarly to the apparatus according to the aforementioned EP-A-1 593 330—simply be cleaned. It can be an independent piece of equipment or a component part of a coffee machine.

In addition to the aforementioned gear pump, a piston pump, an oscillation or vibration pump could also be used as a pump. Advantageously, a pressure of between 0.5 and 15 bar is produced with the pump.

The invention claimed is:

1. A method for producing drinks, comprising:
sucking milk into a suction line and conveying the milk through the suction line and through a line comprising a throttle point to an outlet using a pump;
selectively mixing air or gas with the milk;
providing first and second flow sections from the throttle point to the outlet, the throttle point acting on the milk after being selectively mixed with the air or gas to convert the mixed milk and air or gas into milk foam, only the first section having an associated heater; and
controlling flow of milk or milk foam from the throttle point to the outlet through the first and second sections to provide heated milk or milk foam at the outlet when the milk or milk foam passes through the first section and to provide unheated milk or milk foam at the outlet when the milk or milk foam passes through the second section.

2. The method according to claim 1, further comprising sucking the milk out of a container.

3. The method according to claim 1, wherein the step of sucking milk into a suction line and conveying the milk through the suction line and through a line comprising a throttle point to an outlet using a pump comprises sucking the milk from one of a plurality of fluid-containing containers and providing a valve to control the flow from the containers to the suction line.

4. The method of claim 1, wherein the step of controlling flow of the milk or milk foam from the throttle point to the outlet through the first and second sections comprises arranging a valve in the line that extends from the pump to the outlet and changing a position of the valve to cause flow through the first section or the second section.

5. The method of claim 4, further comprising positioning the throttle point after the pump and before the valve in a flow direction.

6. The method of claim 1, wherein the first and second sections lead to a common outlet line adjacent the outlet.

* * * * *